Aug. 17, 1937.  J. VAN VULPEN  2,090,013
STEAM HEATING SYSTEM
Filed Jan. 17, 1936  2 Sheets-Sheet 2
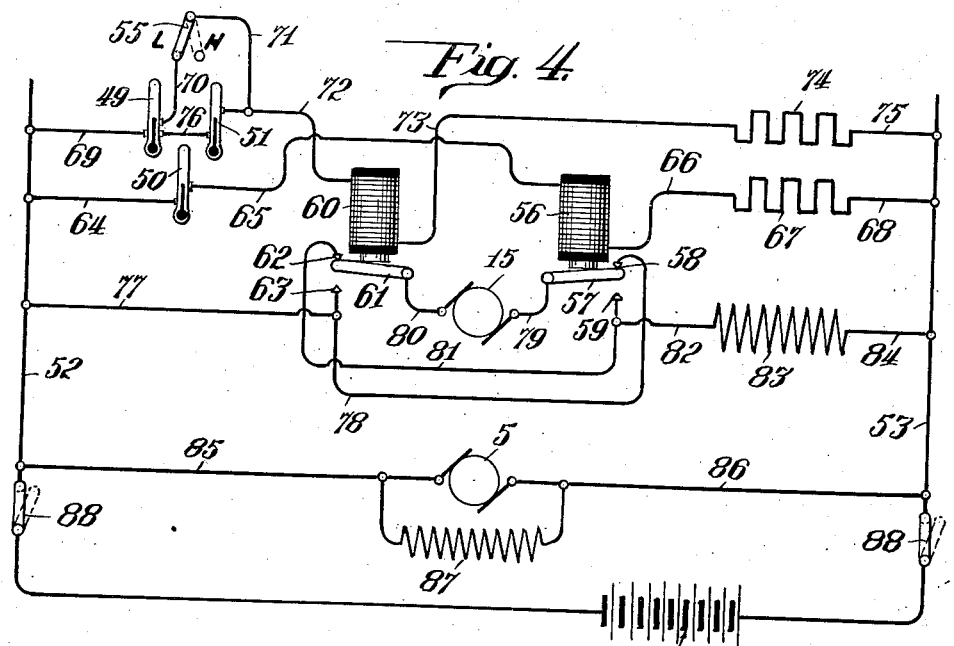
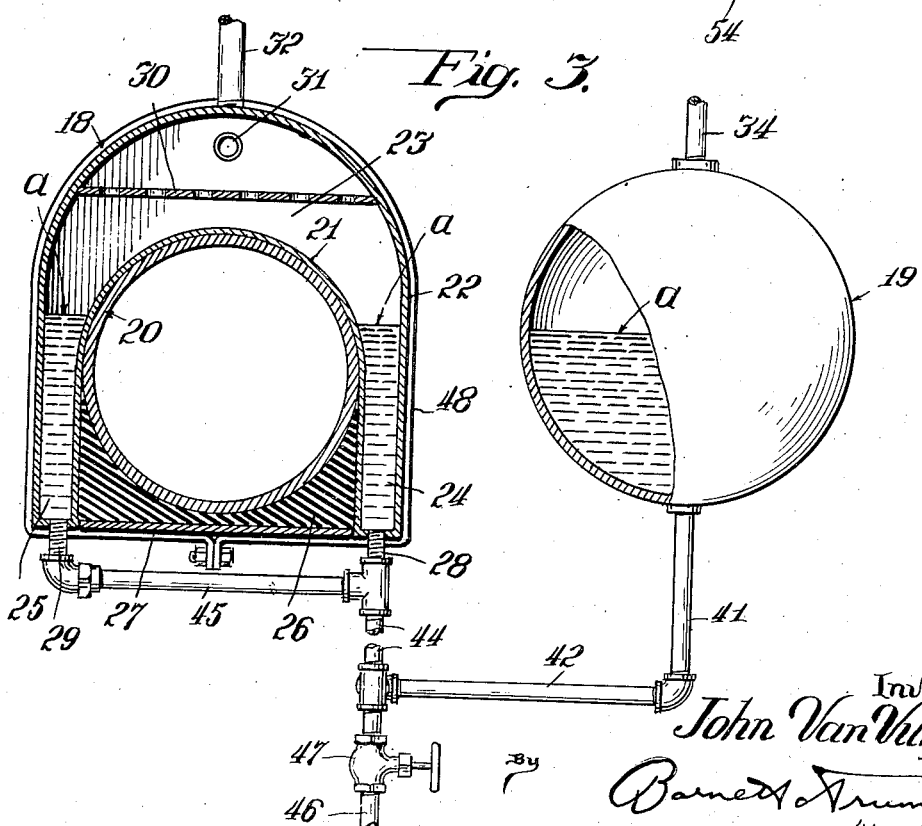

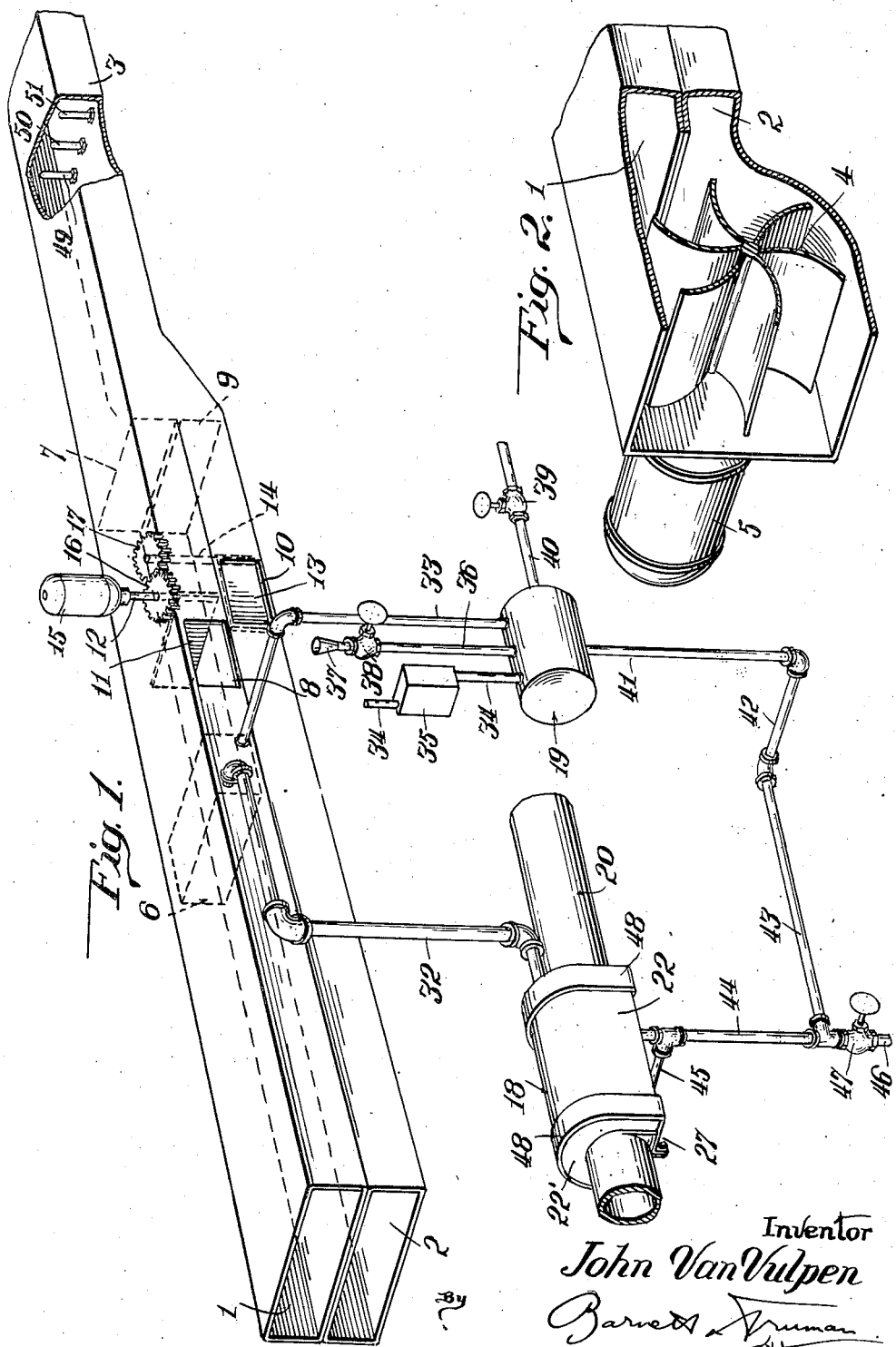

Patented Aug. 17, 1937

2,090,013

UNITED STATES PATENT OFFICE 2,090,013

STEAM HEATING SYSTEM

John Van Vulpen, Chicago, Ill., assignor to Vapor Car Heating Company, Inc., Chicago, Ill., a corporation of New York Application January 17, 1936, Serial No. 59,568

10 Claims. (Cl. 237—12.3)

This invention relates to certain new and useful improvements in a steam heating system particularly adapted for use on aeroplanes, or in other situations where there is available a constant supply of otherwise wasted heat which may be used for converting water into steam or vapor.

In aeroplanes, or other devices involving an internal combustion engine, there is a continuous flow (when the engine is operating) of highly heated gases which are vented through the exhaust pipe. In a heating system of the type herein disclosed, a small generator is so constructed as to hold a relatively small quantity of water in intimate relation to the highly heated exhaust pipe so that this water will be flashed into steam. The water in the generator is continuously replaced, and the steam is conducted into a radiator where it is condensed, the heat being transferred to an air stream flowing over the radiator and used for heating a compartment, such as the cabin of the aeroplane. The condensed steam drains back into a tank or reservoir, from which water flows into the lower portion of the generator to renew the supply therein. This circulation of fluid is continuous as long as the engine is in operation, that is as long as highly heated gases are being vented through the exhaust pipe. Since the radiator is being continuously heated to a maximum temperature, means is provided for mixing a selected portion of the highly heated air passing over the radiator with a proper proportion of unheated air so that the mixture delivered into the compartment will maintain the desired temperature. Heated air that is not needed is dissipated into the outer air.

The general object of this invention is to provide an improved heating system of the type briefly described hereinabove and disclosed more in detail in the specifications which follow.

Another object is to provide a simple and effective heating apparatus utilizing heat derived from the waste gases of an internal combustion engine.

Another object is to provide an improved type of flash steam generator to be used in combination with the exhaust pipe of an internal combustion engine.

Another object is to provide a continuously operating steam heating system using a small quantity of water maintained at a substantially constant but adjustable level within the generator.

Other objects and advantages of this invention will be more apparent from the following detail description of one approved form of apparatus constructed and operating according to the principles of this invention.

In the accompanying drawings:

Fig. 1 is a perspective, partially diagrammatic view of the principal elements of the heating system.

Fig. 2 is a perspective view, similar to the upper left-hand portion of Fig. 1 showing a blower for forcing the air into and through the conduits.

Fig. 3 is a transverse vertical section through the generator and supply tank.

Fig. 4 is a wiring diagram of one suitable type of electrical control system for regulating the temperature maintained by this improved heating apparatus.

Referring first to Fig. 1, air forced into a pair of inlet air conduits 1 and 2 discharges into a main conduit 3 which delivers the air into a compartment to be heated, for example the cabin of the aeroplane. In the case of an aeroplane, outside air will be continually forced into the inlet conduits 1 and 2 by a suitable scoop device and the rotating propeller. If not used on a moving vehicle such as an aeroplane, a blower such as indicated at 4 (Fig. 2) and driven by the motor 5 may be used for forcing a stream of air through the conduits. The conduits 1 and 2 may receive only unheated outside air, or a portion of this air may be received from within the compartment. In any case, what may be described as "unheated" air is drawn or forced into each of the inlet conduits 1 and 2.

A radiator 6 is positioned in one of the inlet conduits, for example the conduit 1, so that the air forced through this conduit will pass in intimate relation to the radiator and be heated thereby. This radiator 6 is constantly heated (as will be hereinafter described) to a rather high temperature, regardless of whether heat is needed within the compartment or not.

The hot-air conduit 1 has a discharge outlet 7 at its end leading into the main conduit 3, and also an auxiliary outlet 8 in one side through which the heated air may be vented or dissipated into the outer air. Similarly, the cold air conduit 2 has a discharge outlet 9 leading into the main conduit 3 and an auxiliary discharge outlet 10 leading to the open air. A swinging vane or valve 11, pivotally mounted at one end on the shaft 12, is positioned in inlet conduit 1 so as to alternatively open or close the outlets 7 and 8, or to direct desired proportions of the heated air through these respective outlets. A similar valve or vane 13 is pivoted at one end on shaft 14 and mounted in the inlet conduit 2 so as to alternatively open or close the two outlets 9 and 10. The shaft 14 is driven by a reversible motor 15, and the shafts 12 and 14 are connected by a pair of intermeshing gears 16 and 17, so that the shafts will be driven in opposite directions and consequently the valves 11 and 13 will be swung in opposite directions as the motor is rotated. In the position shown in Fig. 1, the valve 11 is so adjusted as to close the outlet 7 and open the outlet 8, all of the heated air being vented to the atmosphere. On the other hand the vane 12 is swung so as to close the outlet 10 and open the outlet 9 so that all of the air drawn in through inlet conduit 2 is discharged into the main conduit 3. In this position no heat will be added to the air delivered through conduit 3. If the valves 11 and 12 were swung to their opposite limits (so as to close the outlet 8 and open the outlet 10) all of the air delivered into main conduit 3 would be heated. It will now be apparent that by adjusting the vanes 11 and 12 to some selected intermediate position, the proportions of the heated and unheated air that are delivered into main conduit 3 may be selected as desired so as to maintain any desired temperature within the compartment that is to be heated.

The radiator 6 is preferably heated by steam, this steam heating system comprising, in addition to the radiator 6, the improved boiler or generator 18 and the water tank or reservoir 19, the generator, radiator and tank being connected in a closed circuit or loop. This circuit is "closed" in the sense that no fluids are normally vented from this circulating system, but is "open" in the sense that a continuous circulation of these fluids is normally permitted there being no valves or other controlling means normally used.

At 20 is shown a section of the exhaust pipe through which the products of combustion are vented from the internal combustion engine. This pipe 20 becomes very highly heated when the engine is in operation, but all of this heat is normally wasted. The generator 18 (see also Fig. 3) is so constructed as to fit closely about a section of the exhaust pipe 20 and utilize heat from the exhaust gases for generating steam. This generator is preferably of the saddle type so as to be easily positioned on or removed from the pipe 20 and comprises an inner U-shaped shell 21 adapted to rest upon the exhaust pipe 20, and a similar outer shell 22 spaced from the inner shell so as to form a U-shaped compartment comprising an upper steam space 23 and a pair of downwardly extending side legs 24 and 25 which are normally filled with water. It will be understood that the inner and outer shells 21 and 22 are connected by end walls 22' and the legs 24 and 25 are closed at the bottom so as to completely enclose the generating chamber. The space between the lower portions of the legs 24 and 25 is preferably filled with insulation 26 supported by the removable bottom wall 27 held in place by straps 48 or other suitable securing means. A pair of water inlet pipes 28 and 29 lead into the bottom portions of legs 24 and 25 so as to supply water thereto and keep this water up to a predetermined level such as indicated at a, this level being determined by the corresponding water level in the supply tank 19 as will be hereinafter described. It will be noted that only the upper portions of the bodies of water in the respective legs 24 and 25 are in intimate contact with the highly heated exhaust pipe 20, and the heat at this location is so intense that these relatively small bodies of water will be very quickly flashed into steam. The relatively cold water that enters the lower portions of the legs through inlet pipes 28 and 29 is at first spaced from the heating pipe 20 by insulation 26, but gradually approaches the pipe as the water rises in the legs thus preheating the water before it comes in contact with the hot exhaust pipe and is flashed into steam. By holding the water level at the desired height, the quantity of water in contact with the exhaust pipe and the rate of evaporation may be controlled to fit the requirements, and undesired super-heating of the steam will be prevented. It will be understood that this generator is of relatively small capacity. For example, if the exhaust pipe is about five inches in diameter the legs 24 and 25 may have an inner diameter of no more than one inch. The length of the generator will be just sufficient to produce the desired quantity of steam, for example about two feet. It will be understood that the figures here given are merely by way of example, and are only intended to bring out the fact that a relatively small quantity of water is held in the boiler or generator, and an even smaller quantity of water is in direct steam producing engagement with the exhaust pipe at any one time.

A perforated "dry-plate" 30 is preferably positioned horizontally of the upper portion of steam chamber 23, the purpose of this plate being to permit the upward passage of steam but prevent any appreciable quantities of water from rising above this plate in case bubbling or violent boiling takes place within the generator. The steam passes from steam chamber 23 through outlet 31 and supply pipe 32 into the radiator 6.

After the steam has been condensed in radiator 6 and has given up a portion of its heat to the air current flowing through conduit 1, the resulting condensate drains down through pipe 33 into the supply tank 19. This tank is provided with an upwardly extending vent pipe 34 which is open to the atmosphere so that the entire steam heating system will normally be under substantially atmospheric pressure. Since some steam may find its way from the radiator through pipe 33 into tank 19, a condenser 35 is connected in the vent pipe 34 and the steam condensed therein will drain back through pipe 34 into the tank 19. This prevents the loss of any substantial quantity of water from the system. It will be understood that the condenser should be so positioned as to be exposed to a cooling air stream. It might be positioned in conduit 1 in advance of the radiator 6.

Since the entire system is under substantially atmospheric pressure, the water will be at substantially the same constant level a in both the reservoir 19 and generator 18. The required quantity of water may be supplied through the filling pipe 36 leading into the upper portion of tank 19 and provided at its upper end with funnel 37 and normally closed valve 38. By opening the normally closed valve 39 in a drain pipe 40 leading from one end of tank 19, the water in the tank may be drained out down to a predetermined level, thus determining the normal water level in the tank and boiler. Any other suitable means may be provided for filling the tank and generator to the desired level, which level may be varied in accordance with the rate of evaporation required. The connected pipe sections 41, 42, 43, 44 and 45 lead from the bottom of tank 19 to the two inlet pipes 28 and 29 extending into the legs 24 and 25 of the generator. This pipe loop is normally open so that the water level in the tank and generator will always remain substantially the same. A drain pipe 46 provided with normally closed valve 47 permits water to be drained from the heating system.

It should be understood that the parts of this system are all relatively small, and the system requires only a very small amount of water. For example, a total quantity of one gallon of water in the system is sufficient for a heat delivery of 100,000 B. t. u. per hour.

It will be understood that when the engine is in operation and heated gases are passing through the exhaust pipe 20, there will be a continuous flow of fluid through the closed loop of the heating system. Water will be continuously vaporized in the generator 18, the steam flowing into radiator 6 and there condensing so that the resulting water flows back into tank 19. Water from tank 19 will continuously flow into the lower portion of generator 18 so as to maintain the water level constant in the tank and generator. When properly designed and adjusted, the rate of production of steam in the generator 18 will be just about sufficient to supply the amount of steam that will be condensed in radiator 6 so that only condensate flows back through pipe 33 into the tank 19. If an excess of steam is produced, this steam will attempt to escape from tank 19 through the vent pipe 34 but will be condensed in condenser 35 and drained back into the tank 19 provided the excess is not too great. In the event too much liquid is present in the system, a portion will escape as steam through the vent 34, thus automatically adjusting the amount of liquid required.

It will be noted that this steam heating system is very simple, there being no controls whatever other than those provided for maintaining the desired water level. This water level need only be tested and adjusted at long intervals, since substantially all of the water is retained in the system.

Since the radiator 6 will be continuously heated to a maximum capacity it is essential that only a desired proportion of the air heated by this radiator be directed into the compartment to be heated. For this reason the system of air-proportioning valves hereinabove referred to has been provided, and, preferably, thermostatic means are used for adjusting these valves in accordance with temperature changes within the compartment. As here shown, a series of thermostats 49, 50 and 51 are positioned in the main conduit 3, beyond the mixing valves, so as to respond to the temperature of the air being delivered into the compartment. Alternatively, these thermostats could be positioned in the compartment itself. In any case these thermostats control the operation of the reversible motor 15 to adjust the valves 11 and 13 to the desired positions.

In Fig. 4 is shown, by way of example, an electrical control system that could be used. It will be understood that any suitable control system may be adopted whereby the vanes can be adjusted in accordance with temperature conditions in the space to be heated. Referring now to Fig. 4, the power mains 52 and 53 are connected with the respective terminals of the battery or other source of power indicated at 54. Each of the three thermostats 49, 50 and 51 (which may be designated as the low, medium and high temperature thermostats respectively) is adapted to complete a circuit therethrough when a certain predetermined temperature is reached in the space where the thermostat is positioned. These thermostats are shown as being of the mercury column type, each provided with a contact in constant engagement with the mercury column and another upper contact which will be engaged by the mercury column when the predetermined temperature is reached. For example the thermostats here shown may be adapted to close their respective circuits at 70°, 73° and 76° Fahrenheit respectively. At 55 is shown a temperature selecting switch which may be moved to either of two positions to determine whether the temperature shall be maintained within a low or a high temperature range. When the switch is in the position now shown in solid lines, the temperature will be maintained in the low range, that is between 70° and 73°. When this switch is moved to the dotted line position the temperature will be maintained in the higher range, that is between 73° and 76°.

At 56 is shown a relay magnet adapted when energized to draw up the armature or movable contact 57 into engagement with a fixed contact 58. When magnet 56 is deenergized the contact 57 will fall into engagement with a second fixed contact 59. A second similar magnet 60 is adapted when energized to pull the movable contact 61 up into engagement with a fixed contact 62. When the magnet is deenergized, movable contact 61 will fall into engagement with a second fixed contact 63.

When the certain predetermined temperature for which medium thermostat 50 is adjusted is reached, an energizing circuit for magnet 56 will be completed as follows: From power main 52 through wire 64, thermostat 50, wire 65, magnet 56, wire 66, resistance 67, and wire 68 to the other main 53. When the temperature falls below the selected "medium" temperature, this circuit will be broken and magnet 56 will be deenergized. When switch 55 is in the position shown in solid lines and the low temperature thermostat 49 is in control, a circuit energizing the magnet 60 will be completed when the temperature for which thermostat 49 is adjusted is reached, this circuit being as follows: From main 52 through wire 69, thermostat 49, wire 70, switch 55, wires 71 and 72, magnet 60, wire 73, resistance 74 and wire 75 to the main 53. When switch 55 is thrown to the dotted line position the low temperature thermostat 49 will not be effective, and this last described circuit will not be completed until the higher temperature for which thermostat 51 is adjusted is reached. In this case the energizing circuit will be as follows: From main 52 through wire 69, wire 76, thermostat 51, wire 72, magnet 60, wire 73, resistance 74, and wire 75 to main 53.

With the parts in the positions shown in the drawings, it will be noted that both relays 56 and 60 are energized since the temperature has reached the higher limit of the low temperature range, that is both thermostats 49 and 50 have completed their circuits. It is now desirable that the supply of heat be shut off or diminished. A circuit is now completed as follows: From main 52 through wires 77 and 78, fixed contact 58, movable contact 57, wire 79, reversible motor 15, wire 80, movable contact 61, fixed contact 62, wires 81 and 82, field 83 of motor 15, and wire 84 to the other main 53. The current flowing through motor 15 in this direction will cause the motor to rotate in such a direction as to move the valves 11 and 13 toward the positions shown in Fig. 1, that is so as to cut off the heat supply.

It will be understood that the motor is so geared as to move these vanes very slowly. Since the heat supply is being diminished, the temperature will drop and eventually the circuit through medium temperature thermostat 50 will be broken thereby deenergizing magnet 56 and permitting contact 57 to fall into engagement with fixed contact 59. This will break the circuit last described and motor 15 will stop. If the temperature continues to fall, the circuit through low temperature thermostat 49 will eventually be broken and magnet 60 will be deenergized so that contact 61 will fall into engagement with fixed contact 63. A circuit through motor 15 flowing in the opposite direction will now be completed as follows: From main 52 through wire 77, fixed contact 63, movable contact 61, wire 80, motor 15, wire 79, movable contact 57, fixed contact 59, wire 82, field 83, and wire 84 to the other main 53. This will cause motor 15 to rotate in a reverse direction so as to move the vanes in such a direction as to open conduit 1 and close conduit 2 and thereby increase the proportion of heated air admitted to the compartment. As a result the temperature will be raised. Since the motor moves the vanes or dampers very slowly, after a few cycles the parts will tend to become stabilized so as to maintain the desired temperature without further adjustment. If it is desired to maintain the temperature in the higher range, the switch 55 will be moved to the dotted line position and the two thermostats 50 and 51 will cooperate to control motor 15 in a manner that should now be apparent.

The blower motor 5 (if used) can be connected between the mains 52 and 53 through the wires 85 and 86. At 87 is indicated the shunt field of this motor. By means of switch 88 in the mains 52 and 53 the motor can be started or stopped, and it will be noted that the switch 88 is so positioned that when the blower motor is stopped the entire electrical control system will be inoperative. It will be understood that this motor 5 and its connections will be omitted in installations where a blower is not required, as in aeroplanes.

This heating system is not particularly efficient as far as the conservation of heat energy is concerned, but this is not important since it is intended for use in connection with internal combustion engines or in other installations where the heat used for generating the steam will be wasted in any event. The radiator 6 is continuously heated, and is continuously heating the air stream in conduit 1, (that is when the engine is in operation), and only a small portion of this heated air may actually be used. However, the same amount of heat would have been dissipated through the exhaust pipe so that this heat loss is unimportant. This being the case, the steam heating system may be permitted to operate continuously without any controls and therefore is very simple and effective in its operation. The parts are light and only a small quantity of water is used which makes the system particularly suitable for use on aeroplanes where excess weight must be avoided. At the same time the desired temperature may be maintained in the compartment by simply proportioning the amounts of heated and unheated air that are actually admitted to the compartment or other space the temperature of which is to be controlled.

The improved generator, as here shown by way of example, can be changed in form and proportions, the essential feature of novelty being the introduction and disposal of the water so that it will be pre-heated before vaporization takes place, and the amount of water in vaporizing contact with the extremely hot exhaust pipe can be controlled so as to regulate the rate of vaporization. In this way super-heating of the steam and excessive or dangerous pressures are avoided, and the vaporization and condensation cycle can be balanced so as to operate steadily and continuously for long periods of time.

The thermostatically controlled means for controlling the proportions of heated and unheated air delivered into the compartment to be heated has been made the subject matter of a divisional application, Serial No. 95,758, filed August 13, 1936.

I claim:

1. In combination with a conduit through which passes highly heated fluids, a steam generator comprising a closed hollow casing enclosing a portion of the conduit, the casing comprising a downwardly extending hollow portion only the upper part of which is in intimate heat-transferring relation to the conduit, means for feeding water into the lower portion of the casing, and an outlet pipe for conducting steam from the upper portion of the generator.

2. In combination with a conduit through which passes highly heated fluids, a steam generator comprising a closed hollow casing enclosing a portion of the conduit, the casing comprising a downwardly extending hollow portion only the upper part of which is in intimate heat-transferring relation to the conduit, means for feeding water into the lower portion of the casing, a perforated partition extending transversely of the upper portion of the casing, and a steam outlet pipe leading from the casing above the partition.

3. In combination with a conduit through which passes highly heated fluids, a steam generator comprising a closed hollow casing enclosing a portion of the conduit, the casing being of saddle form and resting on the conduit with a pair of hollow leg portions extending downwardly at the sides thereof so that only the upper portions of the legs are in intimate heat transferring relation with the conduit, insulating material interposed between the lower portion of the conduit and the lower portions of the legs, means for conducting water into the lower portions of the legs, and an outlet pipe for conducting steam from the upper portion of the generator.

4. In combination with a conduit through which passes highly heated fluids, a steam generator comprising a closed hollow casing enclosing a portion of the conduit, the casing being of saddle form and resting on the conduit with a pair of hollow leg portions extending downwardly at the sides thereof so that only the upper portions of the legs are in intimate heat transferring relation with the conduit, insulating material interposed between the lower portion of the conduit and the lower portions of the legs, means for conducting water into the lower portions of the legs, a perforated partition extending transversely of the upper portion of the casing, and a steam outlet pipe leading from the casing above the partition.

5. In combination with a conduit through which passes highly heated fluids, a steam generator comprising a closed hollow casing enclosing a portion of the conduit, the casing being of saddle form and resting on the conduit with a pair of hollow leg portions extending downwardly at the sides thereof so that only the upper portions of the legs are in intimate heat transferring relation with the conduit, insulating material interposed between the lower portion of the conduit and the lower portions of the legs, and a circulating system comprising an outlet pipe for conducting steam from the upper portion of the generator, a radiator, means for conducting condensate from the radiator into the lower portions of the legs, means venting the system at all times to the atmosphere while preventing the escape of steam, and means for maintaining the water within the generator at substantially a predetermined level.

6. In combination with a conduit through which passes highly heated fluids, a steam generator comprising a closed hollow casing enclosing a portion of the conduit, the casing comprising a downwardly extending hollow portion only the upper part of which is in intimate heat-transferring relation to the conduit, and a circulating system comprising an outlet pipe for conducting steam from the upper portion of the generator, a radiator, means for conducting condensate from the radiator into the downwardly extending portion of the generator casing, means venting the system at all times to the atmosphere while preventing the escape of steam, and means for maintaining the water within the generator at substantially a predetermined level.

7. In combination with a conduit through which passes highly heated fluids, a steam generator comprising a closed hollow casing enclosing a portion of the conduit, the casing comprising a downwardly extending hollow portion only the upper part of which is in intimate heat-transferring relation to the conduit, a water tank positioned at substantially the same level as the generator, a pipe connecting the lower portion of the tank with the lower portion of the generator, a radiator positioned at a higher level than the tank and generator, a steam supply pipe leading from the upper portion of the generator to the radiator, and a drain pipe leading from the radiator into the tank, and a vent pipe leading upwardly from the upper portion of the tank and open at all times to the atmosphere so that the heating system will operate under atmospheric pressure and the water will stand at substantially the same level in the tank and generator.

8. In combination with a conduit through which passes highly heated fluids, a steam generator comprising a closed hollow casing enclosing a portion of the conduit, the casing comprising a downwardly extending hollow portion only the upper part of which is in intimate heat-transferring relation to the conduit, a water tank positioned at substantially the same level as the generator, a pipe connecting the lower portion of the tank with the lower portion of the generator, a radiator positioned at a higher level than the tank and generator, a steam supply pipe leading from the upper portion of the generator to the radiator, a drain pipe leading from the radiator into the tank, a vent pipe leading upwardly from the upper portion of the tank and open at all times to the atmosphere so that the heating system will operate under atmospheric pressure and the water will stand at substantially the same level in the tank and generator, and a condenser in the vent pipe.

9. In combination with a conduit through which passes highly heated fluids, a steam generator comprising a closed hollow casing enclosing a portion of the conduit, the casing being of saddle form and resting on the conduit with a pair of hollow leg portions extending downwardly at the sides thereof so that only the upper portions of the legs are in intimate heat transferring relation with the conduit, insulating material interposed between the lower portion of the conduit and the lower portions of the legs, a water tank positioned at substantially the same level as the generator, a pipe leading from the lower portion of the tank and having branches leading to the lower portion of each leg of the generator, a radiator positioned at a higher level than the tank and generator, a steam supply pipe leading from the upper portion of the generator to the radiator and a drain pipe leading from the radiator to the tank, and a vent pipe leading upwardly from the upper portion of the tank and open at all times to the atmosphere so that the system will operate under atmospheric pressure and the water will stand at substantially the same level in the tank and both legs of the generator.

10. In combination with a conduit through which passes highly heated fluids, a steam generator comprising a closed hollow casing enclosing a portion of the conduit, the casing being of saddle form and resting on the conduit with a pair of hollow leg portions extending downwardly at the sides thereof so that only the upper portions of the legs are in intimate heat transferring relation with the conduit, insulating material interposed between the lower portion of the conduit and the lower portions of the legs, a water tank positioned at substantially the same level as the generator, a pipe leading from the lower portion of the tank and having branches leading to the lower portion of each leg of the generator, a radiator positioned at a higher level than the tank and generator, a steam supply pipe leading from the upper portion of the generator to the radiator, a drain pipe leading from the radiator to the tank, a vent pipe leading upwardly from the upper portion of the tank, and open at all times to the atmosphere so that the system will operate under atmospheric pressure and the water will stand at substantially the same level in the tank and both legs of the generator, and a condenser in the vent pipe.

JOHN VAN VULPEN.